(12) United States Patent
Hunt

(10) Patent No.: US 12,085,684 B2
(45) Date of Patent: Sep. 10, 2024

(54) NUCLEAR RADIATION DETECTION

(71) Applicant: X Development LLC, Mountain View, CA (US)

(72) Inventor: Thomas Peter Hunt, Oakland, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 18/164,380

(22) Filed: Feb. 3, 2023

(65) Prior Publication Data

US 2023/0194735 A1 Jun. 22, 2023

Related U.S. Application Data

(63) Continuation of application No. 17/104,361, filed on Nov. 25, 2020, now Pat. No. 11,579,319.
(Continued)

(51) Int. Cl.
*G01T 3/06* (2006.01)
*G01T 7/02* (2006.01)

(52) U.S. Cl.
CPC . *G01T 3/06* (2013.01); *G01T 7/02* (2013.01)

(58) Field of Classification Search
CPC .................................. G01T 3/06; G01T 7/02
See application file for complete search history.

(56) References Cited

U.S. PATENT DOCUMENTS 2,765,411 A * 10/1956 Kerr ........................ G01T 1/20
250/367
4,878,234 A 10/1989 Pfeiffer et al.
(Continued)

FOREIGN PATENT DOCUMENTS

EP 3241041 11/2017
WO WO 2016/109671 7/2016

OTHER PUBLICATIONS https://en.wikipedia.org [online], "Neutron detection," last edited Jan. 25, 2021, retrieved on Feb. 24, 2021, retrieved from URL<https://en.wikipedia.org/wiki/Neutron_detection/>, 12 pages.
(Continued)

*Primary Examiner* — Kiho Kim
(74) *Attorney, Agent, or Firm* — Fish & Richardson P.C.

(57) ABSTRACT

A nuclear radiation detector is disclosed. The detector includes a housing including therein: a scintillator; and a multi-pixel optical sensor positioned, relative to the scintillator, to receive photons emitted by the scintillator in response to interactions with nuclear radiation. The housing isolates the scintillator and the multi-pixel optical sensor from external light. The detector includes one or more processors operably connectable to the multi-pixel optical sensor; and one or more data stores coupled to the processors having instructions stored thereon which cause the processors to perform operations. The operations include: responsive to the multi-pixel optical sensor detecting photons emitted by the scintillator, receiving, from the multi-pixel optical sensor, data signals indicating 1) spatial locations of individual pixels that detected the photons and 2) temporal data indicating when the detections occurred; and generating, from the data signals, a spatially and temporally resolved image of radiation incident on the scintillator.

16 Claims, 6 Drawing Sheets

Related U.S. Application Data

(60) Provisional application No. 62/942,313, filed on Dec. 2, 2019.

(56) References Cited

U.S. PATENT DOCUMENTS

| | | | |
|---|---|---|---|
| 5,289,510 A * | 2/1994 | Mihalczo | G01T 1/2018 |
| | | | 376/253 |
| 5,548,116 A | 8/1996 | Pandelisev | |
| 10,451,750 B2 | 10/2019 | Jaksch et al. | |
| 10,598,799 B1 | 3/2020 | Berlin | |
| 2012/0025089 A1 | 2/2012 | Takagi | |
| 2014/0085481 A1 | 3/2014 | Takahashi et al. | |
| 2017/0111619 A1 | 4/2017 | Benosman | |
| 2018/0329089 A1* | 11/2018 | Bloser | G01T 1/2008 |

OTHER PUBLICATIONS

Bohndiek et al., "Characterization studies of two novel active pixel sensors," Optical Engineering, vol. 46, No. 12, pp. 124003-1 to 124003-11. (Year: 2007).

https://johncaunt.com [online], "Neutron Detection with Scintillators," Sep. 6, 2017, retrieved on Feb. 24, 2021, retrieved from URL<https://johncaunt.com/case-studies/neutron-detection-with-scintillators/>, 4 pages.

* cited by examiner

NUCLEAR RADIATION DETECTION

CROSS-REFERENCE TO RELATED APPLICATION

This application is a continuation of and claims the benefit of U.S. application Ser. No. 17/104,361, filed Nov. 25, 2020, which claims the benefit of U.S. Application No. 62/942,313, filed Dec. 2, 2019, which is incorporated by reference in its entirety.

BACKGROUND

Radiation detectors are used to detect nuclear radiation including neutron radiation and gamma radiation. One exemplary type of radiation detector employs a scintillator. The scintillator includes a material that emits photons in response to interactions with incident nuclear radiation. The emitted photons are proportional to the amount of radiation present in a given area, but generally do not indicate directionality of the sensed radiation.

SUMMARY

In general, the disclosure relates to detecting nuclear radiation. More specifically, the disclosure relates to a system for generating images of nuclear flux using a combination of scintillators and multi-pixel optical sensors.

Nuclear radiation measurement and imaging can be used in fields such as plasma creation, materials science, medical isotope generation, space propulsion, fusion and fission energy. In nuclear radiation measurement, it may be desirable to resolve spatial, time, energy, and wavelength characteristics of nuclear radiation.

Nuclear radiation, e.g., neutron and gamma radiation, can interact with scintillator material to produce photons which are measurable with optical detectors. An example optical detector is a multi-pixel optical sensor, such as a dynamic vision sensor (DVS), or event camera. Pixels of a DVS can trigger based on changes in brightness. A DVS can resolve changes in pixel brightness accurately to under one millisecond. One or more DVSs optically coupled to one or more scintillators can provide a spatially and time resolved image of neutron flux. Several arrangements of scintillators and DVSs can be implemented for improved spatial, time, and spectral characterization of nuclear flux.

In general, innovative aspects of the subject matter described in this specification can be embodied in a nuclear radiation detector. The nuclear radiation detector includes a housing including therein: a scintillator; and a multi-pixel optical sensor positioned, relative to the scintillator, to receive photons emitted by the scintillator in response to interactions with nuclear radiation. The housing isolates the scintillator and the multi-pixel optical sensor from external light. The detector includes one or more processors operably connectable to the multi-pixel optical sensor; and one or more data stores coupled to the one or more processors having instructions stored thereon which, when executed by the one or more processors, causes the one or more processors to perform operations. The operations include: responsive to the multi-pixel optical sensor detecting photons emitted by the scintillator, receiving, from the multi-pixel optical sensor, data signals indicating 1) spatial locations of individual pixels that detected the photons and 2) temporal data indicating when the detections occurred; and generating, from the data signals, a spatially and temporally resolved image of radiation incident on the scintillator.

These and other embodiments may each optionally include one or more of the following features. In some implementations, the multi-pixel optical sensor is a dynamic vision sensor.

In some implementations, a time resolution of the image is less than one millisecond.

In some implementations, the scintillator is positioned between a first reflector and a second reflector, each of the first reflector and the second reflector including a reflective surface that faces opposite side surfaces of the scintillator. The multi-pixel optical sensor is positioned adjacent an edge of the scintillator that is not bounded by either the first reflector or the second reflector.

In some implementations, the scintillator is a large-area scintillator, the detector further including a lens positioned to focus photons emitted by the scintillator in response to interactions with nuclear radiation onto the multi-pixel optical sensor.

In some implementations, the lens is positioned between the large-area scintillator and the multi-pixel optical sensor, and the large-area scintillator, the lens, and the multi-pixel optical sensor are substantially aligned.

In some implementations, the operations further include: determining, from the spatially and temporally resolved image of radiation incident on the scintillator, one or more nuclear radiation flux characteristics.

In some implementations, the one or more nuclear radiation flux characteristics include at least one of a velocity, a direction of travel, a wavelength, and an energy of the radiation incident on the scintillator.

In some implementations, the multi-pixel optical sensor is positioned with light-sensitive regions of the pixels facing the scintillator.

In some implementations, the housing further includes therein: a second scintillator spaced from the scintillator; and a second multi-pixel optical sensor positioned, relative to the second scintillator, to receive photons emitted by the second scintillator in response to interactions with nuclear radiation. The housing isolates the second scintillator and the second multi-pixel optical sensor from external light. The operations further include: responsive to the second multi-pixel optical sensor detecting photons emitted by the second scintillator, receiving, from the second multi-pixel optical sensor, data signals indicating 1) spatial locations of individual pixels that detected the photons and 2) temporal data indicating when the detections occurred; generating, from the data signals, a second spatially and temporally resolved image of radiation incident on the second scintillator; and determining, from the spatially and temporally resolved image of radiation incident on the scintillator, and the second spatially and temporally resolved image of radiation incident on the second scintillator, a nuclear radiation velocity and direction between the scintillator and the second scintillator.

In some implementations, one or more of the scintillator and the second scintillator emits photons in response to interactions with neutrons.

In some implementations, one or more of the scintillator and the second scintillator emits photons in response to interactions with gamma rays.

In some implementations, the scintillator, the multi-pixel optical sensor, the second scintillator, and the second multi-pixel optical sensor are substantially aligned.

In another general aspect, a nuclear radiation detection system includes: a housing including therein: a scintillator; and a multi-pixel optical sensor positioned, relative to the scintillator, to receive photons emitted by the scintillator in response to interactions with nuclear radiation. The housing isolates the scintillator and the multi-pixel optical sensor from external light. The system includes one or more processors operably connectable to the multi-pixel optical sensor; a display operably coupled to the one or more processors; and one or more data stores coupled to the one or more processors having instructions stored thereon which, when executed by the one or more processors, causes the one or more processors to perform operations. The operations include: responsive to the multi-pixel optical sensor detecting photons emitted by the scintillator, receiving, from the multi-pixel optical sensor, data signals indicating 1) spatial locations of individual pixels that detected the photons and 2) temporal data indicating when the detections occurred; generating, from the data signals, a spatially and temporally resolved image of radiation incident on the scintillator; and providing, for presentation on the display, the spatially and temporally resolved image of the radiation incident on the scintillator.

These and other embodiments may each optionally include one or more of the following features. In some implementations, the multi-pixel optical sensor is a dynamic vision sensor.

In some implementations, a time resolution of the image is less than one millisecond.

In some implementations, the scintillator is positioned between a first reflector and a second reflector, each of the first reflector and the second reflector including a reflective surface that faces opposite side surfaces of the scintillator. The multi-pixel optical sensor is positioned adjacent an edge of the scintillator that is not bounded by either the first reflector or the second reflector.

In some implementations, the scintillator is a large-area scintillator, the detector further including a lens positioned to focus photons emitted by the scintillator in response to interactions with nuclear radiation onto the multi-pixel optical sensor.

In some implementations, the lens is positioned between the large-area scintillator and the multi-pixel optical sensor, and the large-area scintillator, the lens, and the multi-pixel optical sensor are substantially aligned.

In another general aspect, a method for nuclear radiation detection includes: receiving, from a multi-pixel optical sensor that is positioned, relative to a scintillator, to receive photons emitted by the scintillator in response to interactions with nuclear radiation, data signals indicating 1) spatial locations of individual pixels that detected the photons and 2) temporal data indicating when the detections occurred; generating, from the data signals, a spatially and temporally resolved image of radiation incident on the scintillator; and providing, for presentation on a display, the spatially and temporally resolved image of the radiation incident on the scintillator.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
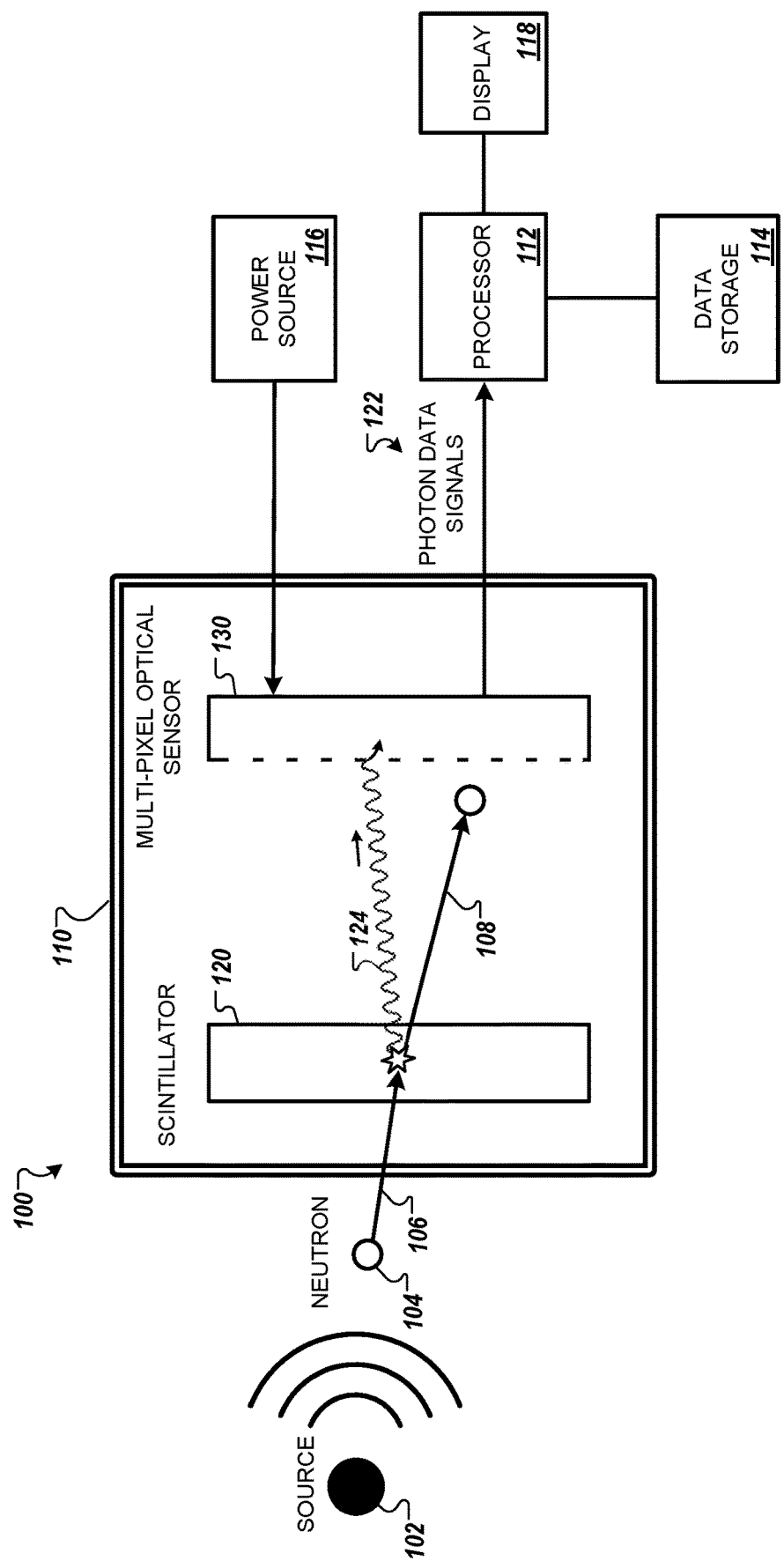
FIG. 1 is a diagram of an exemplary nuclear radiation detector with a multi-pixel optical sensor according to implementations of the present disclosure.

FIG. 1 is a diagram of an exemplary nuclear radiation detector 100 with a multi-pixel optical sensor according to implementations of the present disclosure. The detector 100 includes a housing 110, a scintillator 120, and a multi-pixel optical sensor 130. The detector 100 can also include a power source 116, a processor 112, a display 118, and a data storage 114. The power source 116 can be, but is not limited to, a battery (or battery bank), a solar power source, or an external power source. The processor 112 can be configured to execute software instructions stored in the data storage 114. The processor 112 can receive output signals from the multi-pixel optical sensor 130 and process the signals to determine characteristics of incident nuclear radiation.

The housing 110 encloses the scintillator 120 and the multi-pixel optical sensor 130. The housing 110 can isolate the scintillator 120 and the multi-pixel optical sensor 130 from external light. For example, the housing can isolate the scintillator 120 and optical sensor 130 from external light to prevent false radiation detection signals.

The scintillator 120 includes a luminescent material. When the scintillator 120 interacts with nuclear radiation, the scintillator 120 absorbs energy from the nuclear radiation and emits the absorbed energy in the form of light, e.g., photons. The scintillator 120 can include any type of luminescent material, e.g., organic or inorganic crystals, liquids, or glasses. The scintillator 120 emits photons in response to interactions with nuclear radiation such as neutrons, gamma rays, or both neutrons and gamma rays.

The multi-pixel optical sensor 130 is positioned, relative to the scintillator 120, to receive photons emitted by the scintillator 120 in response to interactions with nuclear radiation. For example, the multi-pixel optical sensor 130 can be positioned in relative alignment with the scintillator 120. In some examples, the multi-pixel optical sensor 130 can be positioned such that the scintillator 120 is between the multi-pixel optical sensor 130 and a radiation source. In some examples, the multi-pixel optical sensor 130 can be positioned with light sensitive regions of pixels directed towards (e.g., facing) the scintillator 120. In some examples, the multi-pixel optical sensor 130 is positioned within a minimum and maximum distance to the scintillator 120, e.g., from directly in contact with the scintillator 120 to one hundred centimeters from the scintillator 120.

The multi-pixel optical sensor 130 can be a camera that produces multi-pixel images from incoming light. The multi-pixel optical sensor 130 can be implemented as, for example, a dynamic vision sensor (DVS), a charge coupled device (CCD) array, or other appropriate optical sensing device. For instance, each pixel of a DVS can operate independently. Each pixel is activated in response to changes in detected brightness. Since the pixels of a DVS respond to changes in brightness, but remain inactive otherwise, a DVS can produce accurate representations of pixel brightness changes at a high temporal resolution. For example, a DVS may be able to detect pixel brightness changes with a temporal resolution of less than one millisecond.

In operation, a nuclear radiation source 102 emits nuclear radiation, e.g., a neutron 104. The neutron 104 travels with a direction represented by arrow 106. The neutron 104 enters the housing 110 and impacts the scintillator 120. The scintillator 120 absorbs energy from the neutron 104 and emits the energy as a photon 124. As a result of interacting with the scintillator 120, the neutron 104 may slow and deflect. The neutron 104 can continue to travel through the scintillator 120 and the housing 110 at a direction represented by arrow 108.

The multi-pixel optical sensor 130 receives the photon 124 at one or more pixels. The multi-pixel optical sensor 130 can transmit photon data signals 122 to the processor 112. The photon data signals 122 can indicate spatial locations of individual pixels that detected the photon 124. The photon data signals 122 can also indicate temporal data indicating the relative timing between different photon detections.

The processor 112 can generate, from the photon data signals 122, a spatially and temporally resolved image of radiation incident on the scintillator 120. The processor 112 can control operation of the display 118 to present the image.

Though the example of FIG. 1 is described with reference to neutron radiation, the detector 100 can also be configured to detect gamma radiation or a combination of neutron and gamma radiation.

FIGS. 2-5 illustrate additional configurations of scintillators and multi-pixel optical sensors according to implementations of the present disclosure. Detector operation in FIGS. 2-5, including operations of the housing, power source, processor, data storage, and display, are similar to operations of the detector 100 described with reference to FIG. 1.

Figure 2:
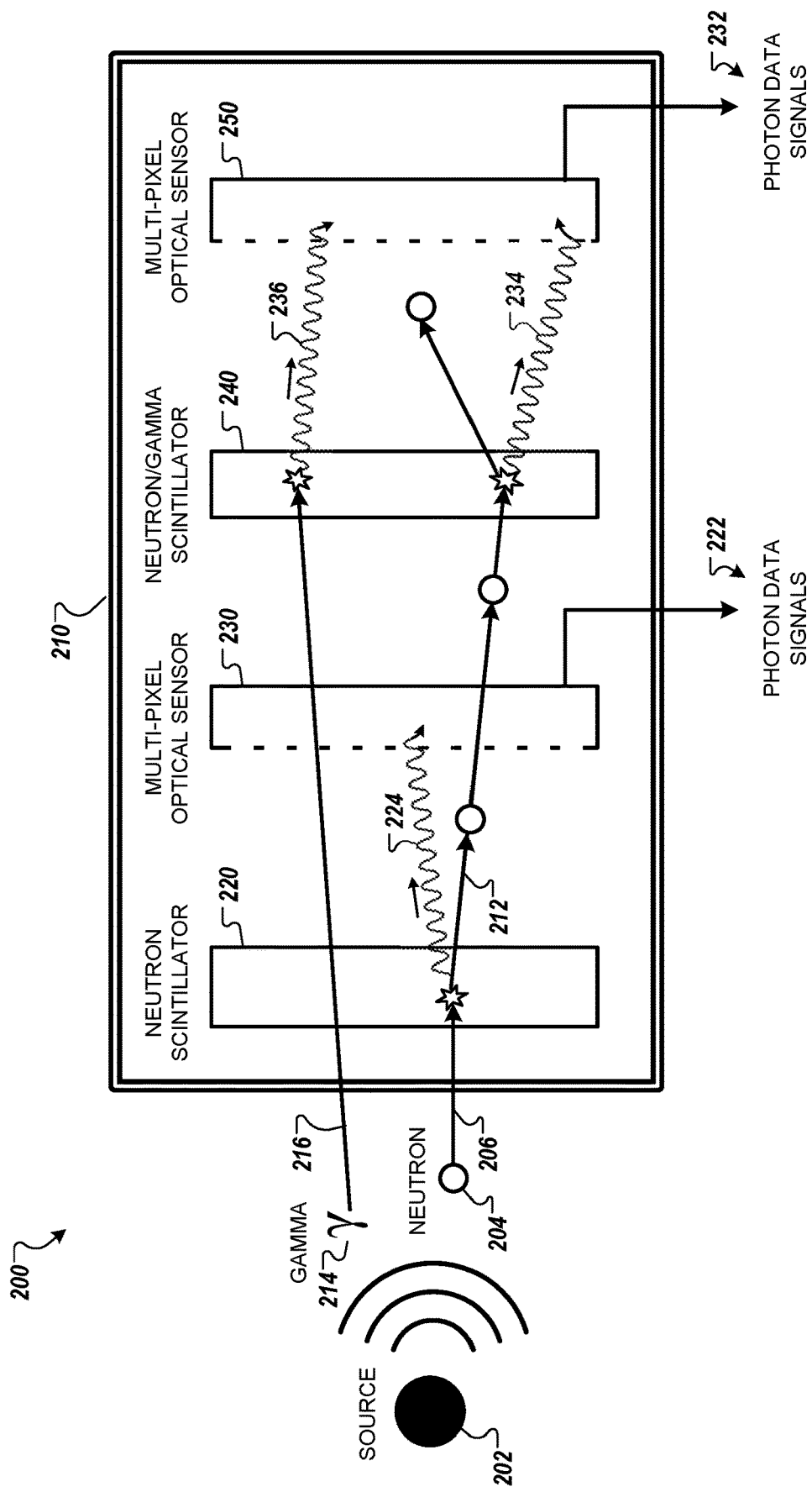
FIG. 2 is a diagram of an exemplary nuclear radiation detector with more than one multi-pixel optical sensor according to implementations of the present disclosure.

FIG. 2 is a diagram of an exemplary nuclear radiation detector 200 with more than one multi-pixel optical sensor according to implementations of the present disclosure. The detector 200 includes a housing 210, a neutron scintillator 220, and a first multi-pixel optical sensor 230. The detector 200 also includes a neutron/gamma scintillator 240 and a second multi-pixel optical sensor 250. The neutron scintillator 220 includes materials that interacts highly with neutrons, but does not interact highly with gamma rays. For example, the neutron scintillator 220 may have a higher nuclear cross section for neutrons than for gammas, where the nuclear cross section characterizes the probability that a nuclear reaction will occur. The neutron/gamma scintillator 240 includes materials that interact highly with both neutrons and gamma rays, e.g., the neutron/gamma scintillator 240 has a similar nuclear cross section for both neutrons and gamma rays. Similar to the detector 100, though not shown in FIG. 2, the detector 200 operably connects to a power source, a processor, a display, and a data storage.

The first multi-pixel optical sensor 230 is positioned, relative to the neutron scintillator 220, to receive photons emitted by the neutron scintillator 220 in response to interactions with nuclear radiation. For example, the first multi-pixel optical sensor 230 can be positioned in relative alignment with the neutron scintillator 220. In some examples, the first multi-pixel optical sensor 230 can be positioned such that the neutron scintillator 220 is between the first multi-pixel optical sensor 230 and a radiation source. In some examples, the first multi-pixel optical sensor 230 can be positioned with light sensitive regions of pixels directed towards (e.g., facing) the neutron scintillator 220.

The second multi-pixel optical sensor 250 is positioned, relative to the neutron/gamma scintillator 240, to receive photons emitted by the neutron/gamma scintillator 240 in response to interactions with nuclear radiation. For example, the second multi-pixel optical sensor 250 can be positioned in relative alignment with the neutron/gamma scintillator 240. In some examples, the second multi-pixel optical sensor 250 can be positioned such that the neutron/gamma scintillator 240 is between the second multi-pixel optical sensor 250 and a radiation source. In some examples, the second multi-pixel optical sensor 250 can be positioned with light sensitive regions of pixels facing the neutron/gamma scintillator 240.

In some examples, the neutron scintillator 220, first multi-pixel optical sensor 230, neutron/gamma scintillator 240, and second multi-pixel optical sensor 250 are all positioned in relative alignment. For example, the scintillators 220, 240 and optical sensors 230, 250 can be aligned such that nuclear radiation from the source 202 will interact with both scintillators 220 and 240 in sequence. That is, nuclear radiation emitted from the source may interact with both the neutron scintillator 220 and the neutron/gamma scintillator 240, causing photons to be detected at both the first multi-pixel optical sensor 230 and the second multi-pixel optical sensor 250 in sequence. Moreover, the above configuration creates a time delay between the sequential photon detections which can be processed to determine characteristics of the radiation (e.g., velocity, energy, and/or direction of travel).

As noted above, in some examples, the neutron scintillator 220 only interacts highly with neutron radiation, while the neutron/gamma scintillator 240 interacts highly with both neutron and gamma radiation. In such examples, the relative alignment between the scintillators 220, 240 and optical sensors 230, 250 provides for output photon data signals 222, 232 that can be interpreted to distinguish between different types of radiation. For example, gamma radiation will interact highly with only the neutron/gamma scintillator 240, causing photons to be detected by only the second multi-pixel optical sensor 250, while neutron radiation will interact highly with either or both of the scintillators 220 and 240, causing photon detections at either or both of the optical sensors 230 and 250. Accordingly, neutron radiation can be positively distinguished when a photon detection occurs at the first multi-pixel optical sensor 230 and gamma radiation is likely when a detection occurs only at the second multi-pixel optical sensor 250.

In some examples, the detector 200 can include more than one scintillator that interacts highly with both neutrons and gammas. The detector can differentiate between neutrons and gammas based on analyzing characteristics of the neutron and gamma interaction with the scintillators. For example, the processor can analyze a decay profile of the fluorescence of a photon released by a scintillator to determine whether the photon was produced through neutron interaction or gamma interaction.

The processor can also analyze the time between nuclear interaction with a first scintillator and nuclear interaction with a second scintillator to determine time-of-flight of the nuclear radiation. Gamma rays travel at the speed of light, while neutrons can travel at a wide range of speeds that are slower than the speed of light. Thus, based on the time of flight of the nuclear radiation between the first scintillator and the second scintillator, the processor can determine whether the interactions were produced through neutron interaction or gamma interaction.

In operation, a nuclear radiation source 202 emits nuclear radiation, e.g., a neutron 204 and a gamma ray 214. The neutron 204 travels with a direction represented by arrow 206. The neutron 204 enters the housing 210 and impacts the neutron scintillator 220. The neutron scintillator 220 absorbs energy from the neutron 204 and emits the energy as a photon 224. As a result of interacting with the neutron scintillator 220, the neutron 204 may slow and deflect. The neutron 204 can continue to travel through the neutron scintillator 220 and the housing 210 at a direction represented by arrow 212.

The first multi-pixel optical sensor 230 receives the photon 224 at one or more pixels. The multi-pixel optical sensor 230 can transmit photon data signals 222 to the processor. The photon data signals 222 can indicate spatial locations of individual pixels that detected the photon 224. The photon data signals 222 can also include temporal data indicating the relative timing between different photon detections.

The gamma ray 214 travels with a direction represented by arrow 216. The gamma ray 214 enters the housing 210 and passes through the neutron scintillator 220. The gamma ray 214 impacts the neutron/gamma scintillator 240. The neutron/gamma scintillator 240 absorbs energy from the gamma ray 214 and emits the energy as a photon 236.

The neutron 204 travels with a direction represented by arrow 212. The neutron 204 impacts the neutron/gamma scintillator 240. The neutron/gamma scintillator 240 absorbs energy from the neutron 204 and emits the energy as a photon 234.

The second multi-pixel optical sensor 250 receives each of the photons 234, 236 at one or more pixels. The multi-pixel optical sensor 250 can transmit photon data signals 232 to the processor. The photon data signals 232 can indicate spatial locations of individual pixels that detected the photons 234, 236. The photon data signals 232 can also include temporal data indicating the relative timing between different photon detections.

The photon data signals 222, 232 can include additional data related to the incident photons 224, 234, 236. For example, the photon data signals 222, 232 can include data related to energy levels and wavelengths of the incident photons 224, 234, 236.

The processor can generate, from the photon data signals 222, 232, spatially and temporally resolved images of radiation incident on the scintillators 220, 240. The processor can control operation of the display to present the image.

The processor can analyze the photon data signals 222, 232 and the images of incident radiation to determine additional characteristics of nuclear flux. For example, the processor can determine from the data signals 222, 232 the time of travel of the neutron 204 between the neutron scintillator 220 and the neutron/gamma scintillator 240. The processor can also compare the pixels activated in the first multi-pixel optical sensor 230 and the second multi-pixel optical sensor 250 to determine a direction of travel of the neutron 204 between the neutron scintillator 220 and the neutron/gamma scintillator 240. Thus, from the photon data signals 222, 232, and the resulting images of radiation incident on the scintillators, the processor can determine nuclear flux characteristics, e.g., velocity and direction, of the incident nuclear radiation.

Since the nuclear detector 200 includes both the neutron scintillator 220 and the neutron/gamma scintillator 240, the processor can determine gamma flux characteristics independently of neutron flux characteristics. By including multiple multi-pixel optical sensors, the nuclear detector 200 can produce time and space resolved images of neutron and gamma flux, and can discern between neutron radiation and gamma radiation.

The processor can analyze the photon data signals 222, 232 to correct for multiple nuclear radiation interactions and to perform reconstruction of the nuclear radiation spatial, temporal, energy, and wavelength characteristics. For example, computationally intensive Monte Carlo simulations of neutron 204 and gamma ray 214 travel along the path from the neutron source 202 to the detector 200 can be performed before an experiment. Statistics of simulated detector signals based on the Monte Carlo simulations can be predicted before the experiment. A statistical fitting or classifying algorithm such as linear regression, or a neural network with parameters tuned using the Monte Carlo simulation results can be implemented in real-time during the experiment for feedback, or can be implemented for post-processing data analysis after the experiment.

Though FIG. 2 illustrates a detector 200 with the neutron scintillator 220 and the neutron/gamma scintillator 240, other scintillator combinations are possible. For example, a detector can include any number or combination of neutron scintillators, gamma scintillators, and neutron/gamma scintillators. The arrangement of neutron scintillators, gamma scintillators, and neutron/gamma scintillators can be in any order with respect to the direction of incident nuclear radiation. Each multi-pixel optical sensor can be positioned to receive photons from any combination of one or more scintillators.

Figure 3:
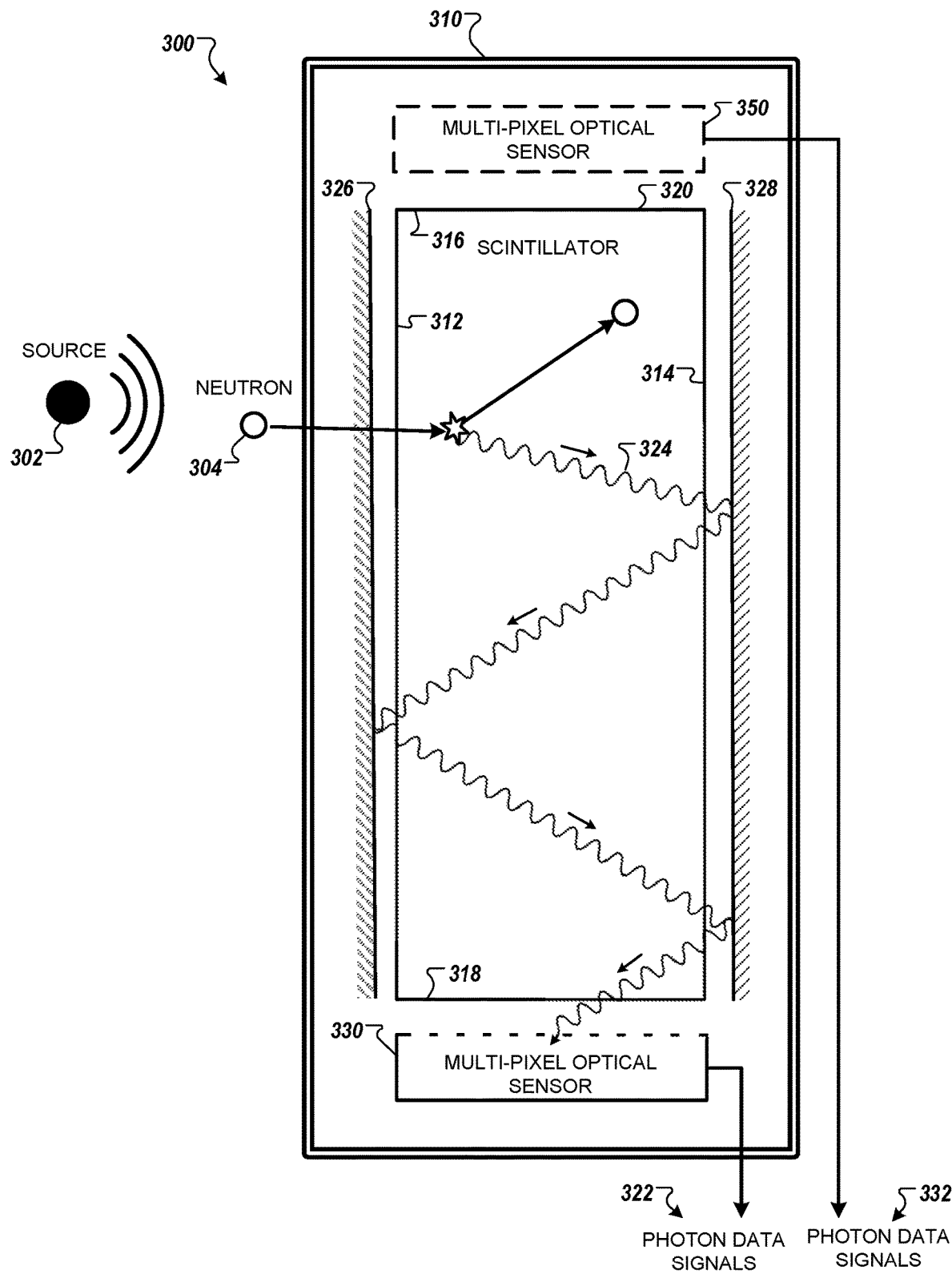
FIG. 3 is a diagram of an exemplary nuclear radiation detector with reflective surfaces around a scintillator according to implementations of the present disclosure.

FIG. 3 is a diagram of an exemplary nuclear radiation detector 300 with reflective surfaces around a scintillator according to implementations of the present disclosure. The detector 300 includes a housing 310, a scintillator 320, a bottom multi-pixel optical sensor 330, and an optional top multi-pixel optical sensor 350.

The scintillator 320 includes a first surface 312 and a second surface 314 that is spaced from the first surface 312 and parallel to the first surface 312. The scintillator 320 also includes edges including a bottom edge 318 and a top edge 316.

The detector 300 includes reflective surfaces 326, 328 adjacent to the first surface 312 and the second surface 314, respectively. For example, the reflective surfaces 326, 328 may be parallel to the first surface 312 and the second surface 314. The reflective surfaces 326, 328 may be positioned in relative alignment with each other and with the scintillator 320.

The bottom multi-pixel optical sensor 330 is positioned adjacent to the bottom edge 318. The optional top multi-pixel optical sensor 350 is positioned adjacent to the top edge 316. For example, the bottom multi-pixel optical sensor 330 and the optional top multi-pixel optical sensor 350 may be positioned with a light-sensitive surface perpendicular to the first surface 312 and the second surface 314. In some examples, the bottom multi-pixel optical sensor 330 and the optional top multi-pixel optical sensor 350 can be positioned with light sensitive regions of pixels facing the scintillator 320. Similar to the detector 100, though not shown in FIG. 3, the detector 300 operably connects to a power source, a processor, a display, and a data storage.

In operation, a nuclear radiation source 302 emits nuclear radiation, e.g., a neutron 304. The neutron 304 enters the housing 310 and impacts the scintillator 320. The scintillator 320 absorbs energy from the neutron 304 and emits the energy as a photon 324.

The photon 324 can reflect one or more times off of the reflective surfaces 326, 328. For example, the photon 324 can reflect off of the reflective surface 328 in the direction of the bottom edge 318, pass through the scintillator 320, and reflect off of the reflective surface 326. The photon 324 can continue to reflect off of the reflective surfaces 326, 328 until the photon 324 exits the scintillator 320 at the bottom edge 318. In this way, the reflective surfaces 326, 328 can form a channel to conduct the photon 324 to the bottom edge 318. Similarly, the reflective surfaces 326, 328 can conduct photons to the top edge 316.

The bottom multi-pixel optical sensor 330 can receive the photon 324 at one or more pixels. The multi-pixel optical sensor 330 can transmit photon data signals 322 to the processor. The photon data signals 322 can indicate spatial locations of individual pixels that detected the photon 324. The photon data signals 322 can also include temporal data indicating the relative timing between different photon detections.

The top multi-pixel optical sensor 350 can receive photons caused by interactions between neutrons and the scintillator 320, and reflected by the reflective surfaces 326, 328. The top multi-pixel optical sensor 350 can transmit photon data signals 332 to the processor.

As described with reference to FIG. 1, the processor can generate, from the photon data signals 322, 332, spatially and temporally resolved images of radiation incident on the scintillator 320. The processor can control operation of the display to present the image.

The processor can analyze the photon data signals 322, 332 and the images of incident radiation to determine additional characteristics of nuclear flux. The processor can also analyze the photon data signals 322, 332 to correct for multiple nuclear radiation interactions.

Though FIG. 3 illustrates a detector 300 with the bottom multi-pixel optical sensor 330 and the optional top multi-pixel optical sensor 350, other combinations are possible. For example, a detector can include any number of multi-pixel optical sensors. Each multi-pixel optical sensor can be positioned to receive photons from any edge of the scintillator. In some examples, e.g., for a scintillator with a rectangular prism shape, the scintillator can include one or more side edges, and the detector can include one or more multi-pixel optical sensors positioned adjacent to each of the side edges.

Figure 4:
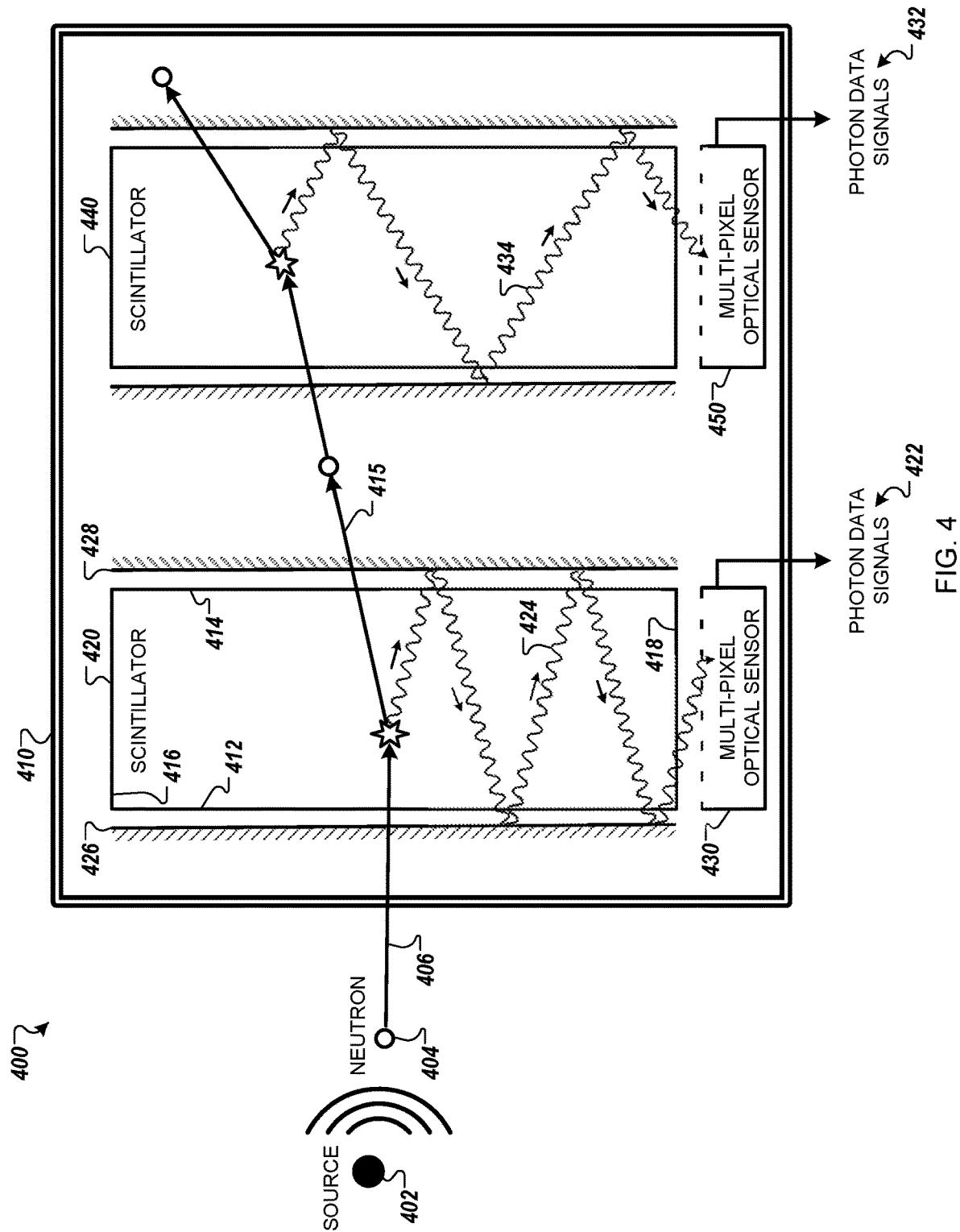
FIG. 4 is a diagram of an exemplary nuclear radiation detector with reflective surfaces around each of a plurality of scintillators according to implementations of the present disclosure.

FIG. 4 is a diagram of an exemplary nuclear radiation detector 400 with reflective surfaces around each of a plurality of scintillators according to implementations of the present disclosure.

The detector 400 includes a housing 410, a first scintillator 420, and a first multi-pixel optical sensor 430. The detector 400 also includes a second scintillator 440 and a second multi-pixel optical sensor 450. Similar to the detector 100, though not shown in FIG. 4, the detector 400 operably connects to a power source, a processor, a display, and a data storage.

The first scintillator 420 includes a first surface 412 and a second surface 414 that is spaced from the first surface 412 and parallel to the first surface 412. The scintillator 420 also includes edges including a bottom edge 418 and a top edge 416.

The detector 400 includes reflective surfaces 426, 428 adjacent to the first surface 412 and the second surface 414, respectively. For example, the reflective surfaces 426, 428 may be parallel to the first surface 412 and the second surface 414. The reflective surfaces 426, 428 may be positioned in relative alignment with each other and with the scintillator 420.

The bottom multi-pixel optical sensor 430 is positioned adjacent to the bottom edge 418. For example, the bottom multi-pixel optical sensor 430 may be positioned with a light-sensitive surface perpendicular to the first surface 412 and the second surface 414. In some examples, the bottom multi-pixel optical sensor 430 can be positioned with light sensitive regions of pixels facing the scintillator 420.

In operation, a nuclear radiation source 402 emits nuclear radiation, e.g., a neutron 404. The neutron 404 travels with a direction represented by arrow 406. The neutron 404 enters the housing 410 and impacts the scintillator 420. The scintillator 420 absorbs energy from the neutron 404 and emits the energy as a photon 424. As a result of interacting with the scintillator 420, the neutron 404 may slow and deflect. The neutron 404 can continue to travel through the scintillator 420 and the housing 410 at a direction represented by arrow 415.

The photon 424 can reflect one or more times off of the reflective surfaces 426, 428. For example, the photon 424 can reflect off of the reflective surface 428, pass through the scintillator 420, and reflect off of the reflective surface 426. The photon 424 can continue to reflect off of the reflective surfaces 426, 428 until the photon 424 exits the scintillator 420 at the bottom edge 418. In this way, the reflective surfaces 426, 428 can form a channel to conduct the photon 424 to the bottom edge 418.

The bottom multi-pixel optical sensor 430 can receive the photon 424 at one or more pixels. The multi-pixel optical sensor 430 can transmit photon data signals 422 to the processor. The photon data signals 422 can indicate spatial locations of individual pixels that detected the photon 424. The photon data signals 422 can also include temporal data indicating the relative timing between different photon detections.

The neutron 404 travels in the direction represented by the arrow 415. The neutron 404 impacts the scintillator 440. The scintillator 440 absorbs energy from the neutron 404 and emits the energy as a photon 434. Similar to the photon 424, the photon 434 can reflect off of reflective surfaces adjacent to surfaces of the scintillator 440 until the second multi-pixel optical sensor 450 receives the photon 434.

The second multi-pixel optical sensor 450 receives the photon 434 at one or more pixels. The second multi-pixel optical sensor 450 can transmit photon data signals 432 to the processor. The photon data signals 432 can indicate spatial locations of individual pixels that detected the photon 424. The photon data signals 432 can also include temporal data indicating the relative timing between different photon detections.

As described with reference to FIG. 2, the processor can generate, from the photon data signals 422, 432, spatially and temporally resolved images of radiation incident on the scintillators 420, 440. The processor can control operation of the display to present the image. The processor can analyze the photon data signals 422, 432 and the images of incident radiation to determine additional characteristics of nuclear flux. The processor can also analyze the photon data signals 422, 432 to correct for multiple nuclear radiation interactions.

Though FIG. 4 illustrates the detector 400 with two neutron scintillators 420, 440, other scintillator combinations are possible. For example, a detector can include any number or combination of neutron scintillators, gamma scintillators, and neutron/gamma scintillators. The arrangement of neutron scintillators, gamma scintillators, and neutron/gamma scintillators can be in any order with respect to the direction of incident nuclear radiation. Each multi-pixel optical sensor can be positioned to receive photons from any combination of one or more scintillators.

Figure 5:
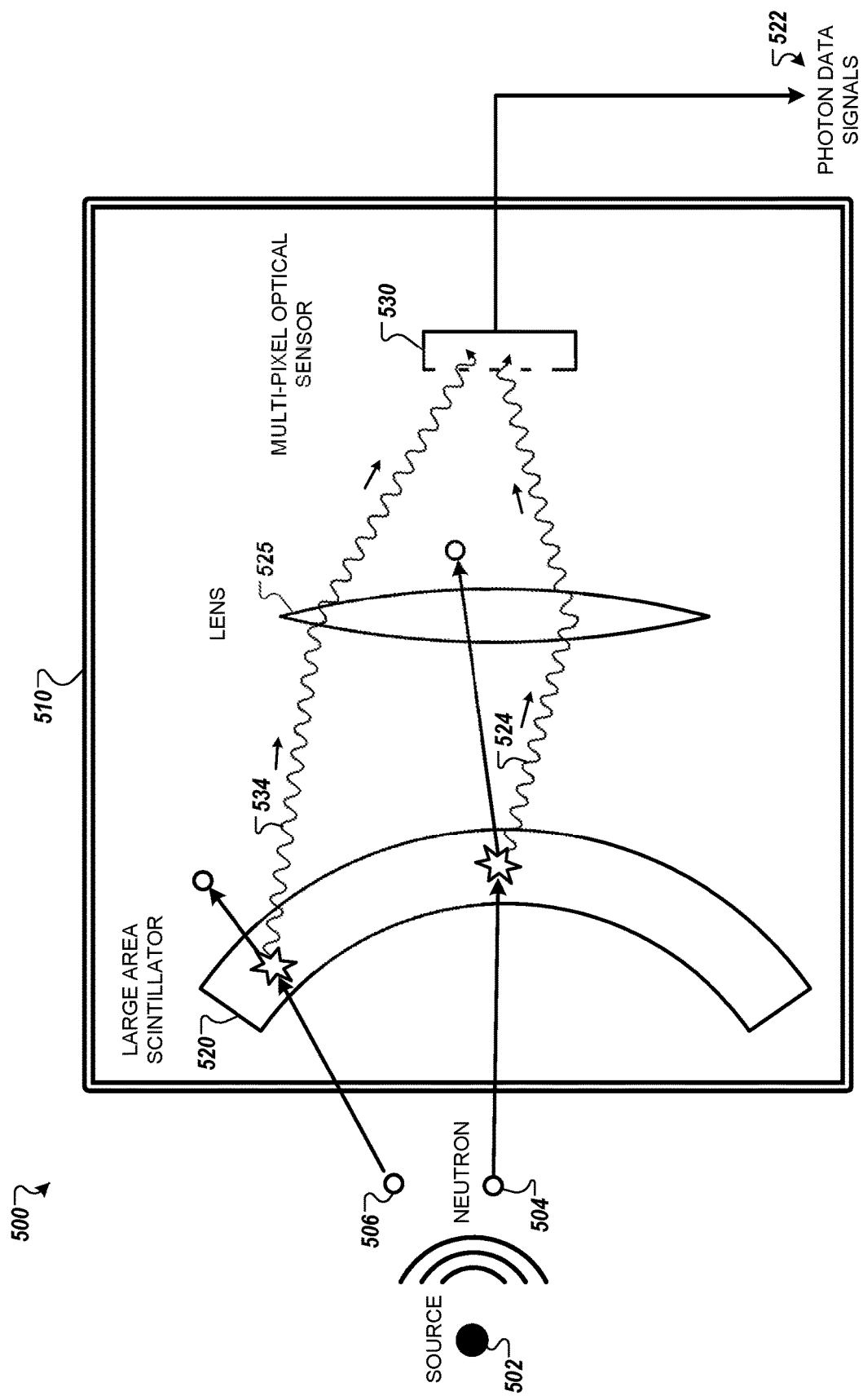
FIG. 5 is a diagram of an exemplary nuclear radiation detector with a large-area scintillator according to implementations of the present disclosure.

FIG. 5 is a diagram of an exemplary nuclear radiation detector 500 with a large-area scintillator according to implementations of the present disclosure.

The detector 500 includes a housing 510, a large-area scintillator 520, and a multi-pixel optical sensor 530. The detector 500 also includes a lens 525. The large-area scintillator 520 can be a scintillator with an area of, e.g., 100 square centimeters, 300 square centimeters, or 600 square centimeters.

The housing 510 encloses the large-area scintillator 520, the lens 525, and the multi-pixel optical sensor 530. The housing 510 can isolate the large-area scintillator 520, the lens 525, and the multi-pixel optical sensor 530 from external light. For example, the housing can isolate the scintillator 120 and optical sensor 130 from external light to prevent false radiation detection signals. Similar to the detector 100, though not shown in FIG. 5, the detector 500 operably connects to a power source, a processor, a display, and a data storage.

The lens 525 is positioned, relative to the large-area scintillator 520, to receive photons emitted by the large-area scintillator 520. For example, the lens 525 can be positioned in relative alignment with the scintillator 520. In some examples, the lens 525 can be positioned such that the scintillator 520 is between the lens 525 and a radiation source. In some examples, the lens 525 is positioned within a minimum and maximum distance to the scintillator 520, e.g., between ten centimeters and one hundred centimeters from the scintillator 520.

The lens 525 is positioned to focus the photons emitted by the large-area scintillator 520 onto the multi-pixel optical sensor 530. For example, the lens 525 can be positioned in relative alignment with, and between, the scintillator 520 and the multi-pixel optical sensor 530.

In some examples, the multi-pixel optical sensor 530 can be positioned with light sensitive regions of pixels facing the lens 525. In some examples, the multi-pixel optical sensor 530 is positioned within a minimum and maximum distance to the lens 525, e.g., between one-tenth of a centimeter and ten centimeters from the lens 525. In some examples, the multi-pixel optical sensor 530 is positioned at or near a focal point of the lens 525.

In operation, a nuclear radiation source 502 emits nuclear radiation, e.g., neutrons 504, 506. The neutrons 504, 506 each enter the housing 510 and impact the large-area scintillator 520. The large-area scintillator 520 absorbs energy from the neutrons 504, 506 and emits the energy as photons 524, 534 respectively.

Due to the large area of the large-area scintillator 520, the large-area scintillator 520 emits photons 524, 534 over a wide area. The lens 525 focuses the photons 524, 534 onto the multi-pixel optical sensor 530. The lens 525 can focus the photons 524, 534 onto the multi-pixel optical sensor 530 by refracting each of the photons 524, 534 inward toward the multi-pixel optical sensor 530. Thus, though the multi-pixel optical sensor 530 may have a small area, the multi-pixel optical sensor 530 can receive photons caused by interactions with nuclear radiation over a large area.

The multi-pixel optical sensor 530 receives the photons 524, 534 at one or more pixels. The multi-pixel optical sensor 530 can transmit photon data signals 522 to the processor. The photon data signals 522 can indicate spatial locations of individual pixels that detected the photons 524, 534. The photon data signals 522 can also indicate temporal data indicating the relative timing between different photon detections.

The processor can generate, from the photon data signals 522, 532, a spatially and temporally resolved image of radiation incident on the large-area scintillator 520. The processor can control operation of the display to present the image.

Figure 6:
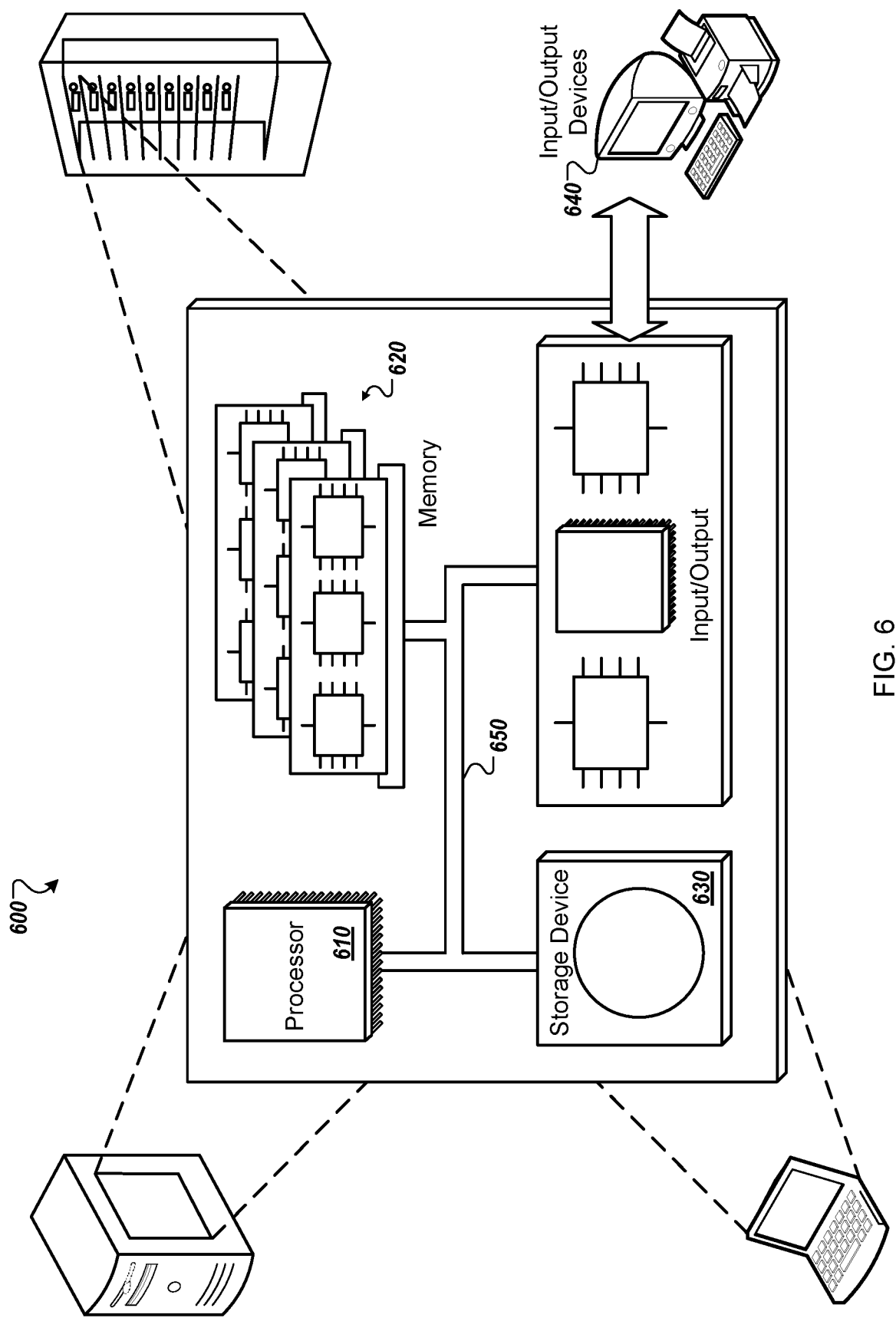
FIG. 6 depicts a schematic diagram of a computer system that may be applied to any of the computer-implemented methods and other techniques described herein.

FIG. 6 depicts a schematic diagram of a computer system that may be applied to any of the computer-implemented methods and other techniques described herein.

For example, the system, or portions thereof, can be implemented as the GMD controller or the server system described above in reference to FIGS. 1 and 2A. The system 600 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As used herein, the terms "perpendicular," "orthogonal," "substantially perpendicular," or "substantially orthogonal" refer to a relation between two elements (e.g., lines, axes, planes, surfaces, or components) that forms a ninety degree (perpendicular) angle within acceptable engineering, machining, or measurement tolerances. For example, two surfaces can be considered orthogonal to each other if the angle between the surfaces is within an acceptable tolerance of ninety degrees (e.g., ±1-2 degrees).

As used herein, the terms "aligned," "substantially aligned," "relatively aligned" "parallel," or "substantially parallel" refer to a relation between two elements (e.g., lines, axes, planes, surfaces, or components) as being oriented generally along the same direction within acceptable engineering, machining, drawing measurement, or part size tolerances such that the elements do not intersect or intersect at a minimal angle. For example, two surfaces can be considered aligned with each other if surfaces extend along the same general direction of a device.

What is claimed is:

1. A nuclear radiation detector comprising:
   a first scintillator;
   a first multi-pixel optical sensor positioned, relative to the first scintillator, to receive photons emitted by the first scintillator in response to interactions with nuclear radiation, wherein:
      the first scintillator is positioned between a first reflector and a second reflector, the first reflector having a reflective surface that faces a first side of the first scintillator, the second reflector having a reflective surface that faces a second side of the first scintillator, and
      the first multi-pixel optical sensor is positioned with a light-sensitive surface of the first multi-pixel optical sensor facing a third side of the first scintillator;
   a second scintillator;
   a second multi-pixel optical sensor positioned, relative to the second scintillator, to receive photons emitted by the second scintillator in response to interactions with nuclear radiation, wherein:
      the second scintillator is positioned between a third reflector and a fourth reflector, the third reflector having a reflective surface that faces a first side of the second scintillator, the fourth reflector having a reflective surface that faces a second side of the second scintillator, and
      the second multi-pixel optical sensor is positioned with a light-sensitive surface of the second multi-pixel optical sensor facing a third side of the second scintillator;
   one or more processors operably connectable to the first and the second multi-pixel optical sensor; and
   one or more data stores coupled to the one or more processors having instructions stored thereon which, when executed by the one or more processors, causes the one or more processors to perform operations comprising:
      responsive to the first multi-pixel optical sensor detecting photons emitted by first the scintillator, receiving, from the first multi-pixel optical sensor, first data signals indicating 1) spatial locations of individual pixels that detected the photons and 2) temporal data indicating when the photons were detected;
      responsive to the second multi-pixel optical sensor detecting photons emitted by the second scintillator, receiving, from the second multi-pixel optical sensor, second data signals indicating 1) spatial locations of individual pixels that detected the photons and 2) temporal data indicating when the photons were detected; and
      determining, from the first data signals and the second data signals, a nuclear radiation path between the first scintillator and the second scintillator.

2. The nuclear radiation detector of claim 1, wherein the first multi-pixel optical sensor comprises a dynamic vision sensor, each pixel of the dynamic vision sensor being configured to output a data signal in response to detecting a change in brightness of received photons.

3. The nuclear radiation detector of claim 1, wherein determining, from the first data signals and the second data signals, the nuclear radiation path between the first scintillator and the second scintillator comprises:
   generating, from the first data signals, a first image of radiation incident on the first scintillator;
   generating, from the second data signals, a second image of radiation incident on the second scintillator; and
   determining, using the first image and the second image, the nuclear radiation path between the first scintillator and the second scintillator.

4. The nuclear radiation detector of claim 3, wherein the first image and the second image each have a spatial resolution and a temporal resolution, the temporal resolution of the first image and of the second image being one millisecond or less.

5. The nuclear radiation detector of claim 1, wherein the nuclear radiation path comprises a velocity and direction of the nuclear radiation.

6. The nuclear radiation detector of claim 1, wherein the first scintillator is a large-area scintillator, the nuclear radiation detector further comprising a lens positioned to focus photons emitted by the first scintillator in response to interactions with nuclear radiation onto the first multi-pixel optical sensor.

7. The nuclear radiation detector of claim 6, wherein:
   the lens is positioned between the large-area scintillator and the first multi-pixel optical sensor.

8. The nuclear radiation detector of claim 1, the operations further comprising:
   determining, from at least one of the first data signals or the second data signals, a flux characteristic of the nuclear radiation.

9. The nuclear radiation detector of claim 8, wherein the flux characteristic of the nuclear radiation comprises a velocity, a direction of travel, a wavelength, or an energy of the nuclear radiation.

10. The nuclear radiation detector of claim 1, wherein one or more of the first scintillator or the second scintillator emits photons in response to interactions with neutrons.

11. The nuclear radiation detector of claim 1, wherein one or more of the first scintillator or the second scintillator emits photons in response to interactions with gamma rays.

12. A method for nuclear radiation detection comprising:
   receiving, from a first multi-pixel optical sensor that is positioned, relative to a first scintillator, to receive photons emitted by the first scintillator in response to interactions with nuclear radiation, first data signals that indicate 1) spatial locations of individual pixels that detected the photons and 2) temporal data indicating when the photons were detected, wherein:
      the first scintillator is positioned between a first reflector and a second reflector, the first reflector having a reflective surface that faces a first side of the first scintillator, the second reflector having a reflective surface that faces a second side of the first scintillator, and
      the first multi-pixel optical sensor is positioned with a light-sensitive surface of the first multi-pixel optical sensor facing a third side of the first scintillator;
   receiving, from a second multi-pixel optical sensor that is positioned, relative to a second scintillator, to receive photons emitted by the second scintillator in response to interactions with nuclear radiation, second data signals that indicate 1) spatial locations of individual pixels that detected the photons and 2) temporal data indicating when the photons were detected, wherein:
  the second scintillator is positioned between a third reflector and a fourth reflector, the third reflector having a reflective surface that faces a first side of the second scintillator, the fourth reflector having a reflective surface that faces a second side of the second scintillator, and
  the second multi-pixel optical sensor is positioned with a light-sensitive surface of the second multi-pixel optical sensor facing a third side of the second scintillator; and
determining, from the first data signals and the second data signal, a nuclear radiation path between the first scintillator and the second scintillator.

13. The method of claim 12, wherein:
the first multi-pixel optical sensor comprises a dynamic vision sensor, and
receiving the first data signals comprises receiving a data signal from each pixel of the dynamic vision sensor in response to the pixel detecting a change in brightness of received photons.

14. The method of claim 12, wherein determining, from the first data signals and the second data signals, the nuclear radiation path between the first scintillator and the second scintillator comprises:
  generating, from the first data signals, a first image of radiation incident on the first scintillator;
  generating, from the second data signals, a second image of radiation incident on the second scintillator; and
  determining, using the first image and the second image, the nuclear radiation path between the first scintillator and the second scintillator.

15. The method of claim 14, wherein the first image and the second image each have a spatial resolution and a temporal resolution, the temporal resolution of the first image and of the second image being one millisecond or less.

16. The method of claim 12, wherein the nuclear radiation path comprises a velocity and direction of the nuclear radiation.

* * * * *